(12) United States Patent
Nomaru (10) Patent No.: US 9,156,108 B2
(45) Date of Patent: Oct. 13, 2015

(54) LASER MACHINING APPARATUS (71) Applicant: Disco Corporation, Tokyo (JP)

(72) Inventor: Keiji Nomaru, Tokyo (JP)

(73) Assignee: Disco Corporation, Tokyo (JP)

( * ) Notice: Subject to any disclaimer, the term of this patent is extended or adjusted under 35 U.S.C. 154(b) by 333 days.

(21) Appl. No.: 13/898,645

(22) Filed: May 21, 2013

(65) Prior Publication Data

US 2013/0319985 A1  Dec. 5, 2013

(30) Foreign Application Priority Data

May 30, 2012  (JP) ................... 2012-122899

(51) Int. Cl.
*B23K 26/06* (2014.01)
*B23K 26/08* (2014.01)

(52) U.S. Cl.
CPC ......... *B23K 26/0665* (2013.01); *B23K 26/0626* (2013.01); *B23K 26/0648* (2013.01); *B23K 26/0807* (2013.01); *B23K 26/0853* (2013.01)

(58) Field of Classification Search
CPC ............................... B23K 26/06; B23K 26/36
USPC ........... 219/121.61, 121.75, 121.78; 359/554, 359/557; 250/492.1
See application file for complete search history.

(56) References Cited

U.S. PATENT DOCUMENTS

| | | | |
|---|---|---|---|
| 4,995,723 A * | 2/1991 | Carlhoff et al. | 356/318 |
| 8,258,428 B2 * | 9/2012 | Morikazu | 219/121.7 |
| 2003/0021214 A1 * | 1/2003 | Tsukuda et al. | 369/112.02 |
| 2010/0053565 A1 * | 3/2010 | Mizushima et al. | 353/38 |

FOREIGN PATENT DOCUMENTS

| | | | |
|---|---|---|---|
| DE | 202011052291 U1 * | 3/2012 | |
| EP | 2329908 A2 * | 6/2011 | |
| JP | 2007-160374 | 6/2007 | |
| JP | 2008-264805 | 11/2008 | |

* cited by examiner

*Primary Examiner* — Samuel M Heinrich
(74) *Attorney, Agent, or Firm* — Greer Burns & Crain, Ltd.

(57) ABSTRACT

A laser machining apparatus includes a chuck table for holding a workpiece, and an irradiation unit which irradiates a laser beam upon the workpiece held on the chuck table. The laser beam irradiation unit includes a condenser which condenses the laser beam and irradiates the condensed laser beam upon the workpiece held on the chuck table. The condenser includes first and second condenser lenses arrayed in series in an advancing direction of the laser beam, a first moving unit having a first driving source for moving the first condenser lens in a first direction perpendicular to an optical axis of the first condenser lens, and a second moving unit having a second driving source for moving the second condenser lens in a second direction perpendicular to the first direction.

4 Claims, 10 Drawing Sheets

FIG. 11 ved regions from each other to produce
LASER MACHINING APPARATUS

BACKGROUND OF THE INVENTION

1. Field of the Invention

The present invention relates to a laser machining apparatus for carrying out laser machining for a workpiece such as a semiconductor wafer.

2. Description of the Related Art

In a semiconductor device fabrication process, the surface of a semiconductor wafer of a substantially disk shape is partitioned into a plurality of regions by dividing lines called streets arrayed in a lattice shape, and devices such as ICs or LSIs are formed in the partitioned regions. Then, the semiconductor wafer is cut along the streets to divide the regions in which the devices are formed from each other to produce individual semiconductor chips.

In order to achieve miniaturization and high performances of an apparatus, a module structure in which a plurality of devices are stacked and bonding pads provided on the stacked devices are connected has been put into practical use. The module structure is configured such that a through-hole (via hole) is formed at each of the locations, in the semiconductor wafer, at which the bonding pads are provided, and a conductive material such as aluminum connecting with the bonding pads is embedded in the through-hole (via hole).

As a method of forming a through-hole (via hole) in a semiconductor wafer as described above, a perforation method for a wafer has been proposed in which a pulse laser beam is irradiated upon a substrate, which configures a semiconductor wafer, from the rear face side to efficiently form a via hole extending to a bonding pad (refer to, for example, Japanese Patent Laid-Open No. 2007-160374). According to this technique, the optical path of a laser beam can be deflected using an acousto-optical device (AOD), and a pulse laser beam is irradiated (for example, in a circular orbit) by a plural number of times upon a region in which a through-hole (via hole) is to be formed to achieve efficient machining.

Also, as a method of forming a through-hole (via hole) in a semiconductor wafer, a laser machining apparatus has been proposed which can deflect the optical axis of a laser beam in an X-axis direction and a Y-axis direction by a galvanometer scanner (refer to, for example, Japanese Patent Laid-Open No. 2008-264805).

SUMMARY OF THE INVENTION

However, in the technique disclosed in Japanese Patent Laid-Open No. 2007-160374, where the optical path of a laser beam is deflected by an acousto-optical device (AOD), the diffraction efficiency varies. Further, the power of a laser beam irradiated from the acousto-optical device (AOD) has a tendency that it becomes non-uniform with a high-power laser, and there is a problem that machining in a high degree of accuracy cannot be carried out.

On the other hand, in the technique disclosed in Japanese Patent Laid-Open No. 2008-264805, a laser beam of stabilized power can be irradiated thanks to use of a galvanometer scanner. However, the galvanometer scanner has a problem that it has such high inertial force that the optical path cannot be displaced instantaneously in an X-axis direction and a Y-axis direction.

Therefore, the object of the present invention resides in provision of a laser machining apparatus in which the optical path of a laser beam of stabilized power can be displaced instantaneously in an X-axis direction and a Y-axis direction.

In accordance with an aspect of the present invention, there is provided a laser machining apparatus including: workpiece holding means for holding a workpiece; and laser beam irradiation means having laser beam oscillation means for oscillating a laser beam, and a condenser for condensing the laser beam oscillated by the laser beam oscillation means and irradiating the condensed laser beam upon the workpiece held on the workpiece holding means. The condenser includes: first and second condenser lenses arrayed in series in an advancing direction of the laser beam; first moving means having a first driving source for moving the first condenser lens in a first direction perpendicular to an optical axis of the first condenser lens; and second moving means having a second driving source for moving the second condenser lens in a second direction perpendicular to the first direction. The laser machining apparatus further includes power supplying means for supplying power to the first driving source of the first moving means and the second driving source of the second moving means.

Preferably, the first driving source and the second driving source are each configured from a piezoelectric device. The power supplying means includes: output adjustment means for adjusting outputs of AC power to be supplied to the first driving source and the second driving source; frequency adjustment means for adjusting a frequency of the AC power the output of which have been adjusted by the output adjustment means; phase adjustment means for adjusting a phase of the AC power to be supplied to the first driving source and the second driving source; and control means for controlling the output adjustment means, frequency adjustment means and phase adjustment means. Further, the control means controls the phase adjustment means so as to form a phase difference of 90 degrees between the AC power to be supplied to the first driving source and the AC power to be supplied to the second driving source.

The condenser which condenses a laser beam oscillated by the laser beam oscillation means in the laser beam irradiation means provided in the laser machining apparatus according to the present invention and irradiates the condensed laser beam upon a workpiece held on the workpiece holding means includes the first condenser lens and the second condenser lens arrayed in series in an optical path direction of the laser beam. The condenser further includes the first moving means having the first driving source for moving the first condenser lens in the first direction perpendicular to the optical axis of the first condenser lens, and the second moving means having the second driving source for moving the second condenser lens in the second direction perpendicular to the first direction. The laser machining apparatus further includes the power supplying means for supplying power to the first driving source of the first moving means and the second driving source of the second moving means. Therefore, for example, by forming a phase difference of 90 degrees between the AC power to be supplied to the first driving source for displacing the first condenser lens in the first direction and the AC power to be supplied to the second driving source for displacing the second condenser lens in the second direction, a focusing spot of the laser beam which is deflected by the first condenser lens and the second condenser lens is moved so as to draw a circular trajectory. By controlling the AC power to be supplied to the first driving source and the second driving source in this manner, the first condenser lens can be displaced in the first direction and the second condenser lens can be displaced in the second direction. Therefore, the laser beam focusing spot of stabilized power can be displaced instantaneously.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
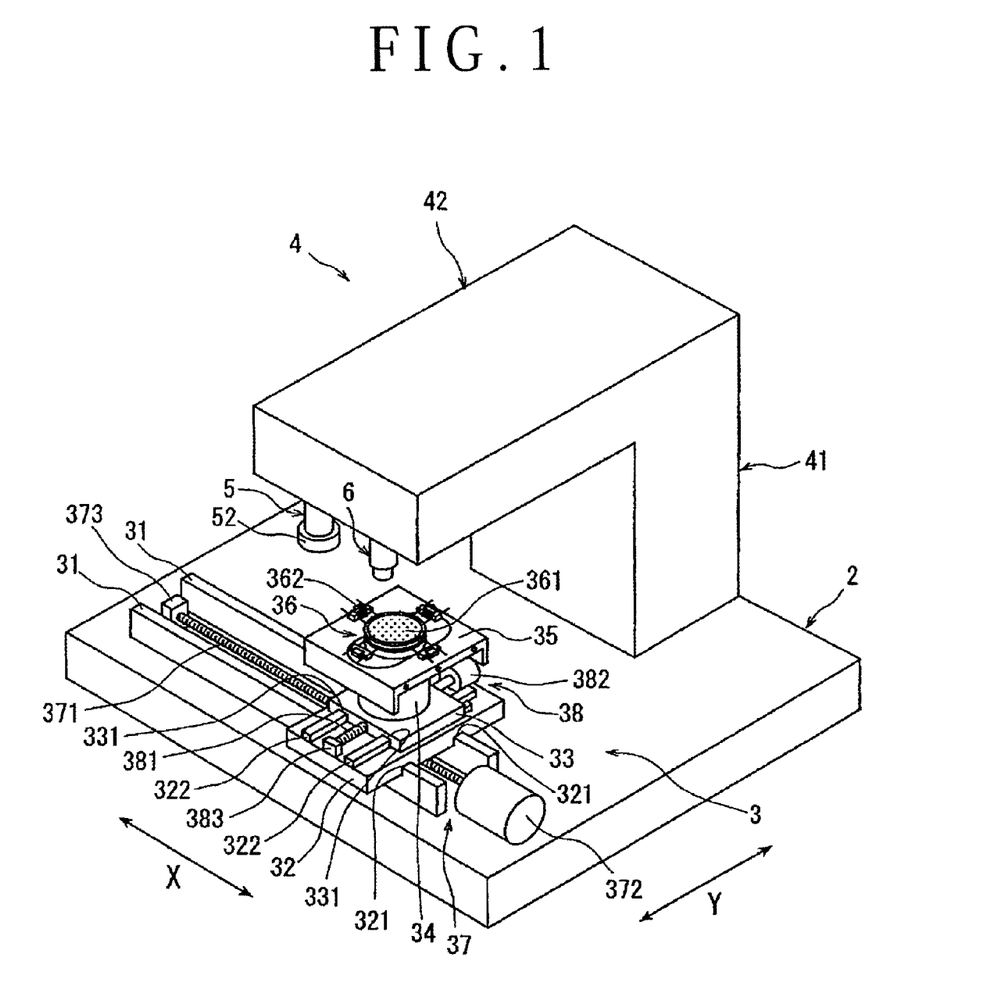
FIG. 1 is a perspective view of a laser machining apparatus configured in accordance with the present invention.

In the following, preferred embodiments of a laser machining apparatus configured in accordance with the present invention are described in detail with reference to the accompanying drawings. FIG. 1 shows a perspective view of the laser machining apparatus configured in accordance with the present invention. The laser machining apparatus shown in FIG. 1 includes a stationary base 2, a chuck table mechanism 3 disposed for movement in a machining feeding direction (X-axis direction) indicated by an arrow mark X on the stationary base 2 for holding a workpiece thereon, and a laser beam irradiation unit 4 disposed on the stationary base 2 and serving as laser beam irradiation means.

The chuck table mechanism 3 includes a pair of guide rails 31, 31 disposed in parallel to each other along the X-axis direction on the stationary base 2, and a first sliding block 32 disposed for movement in the X-axis direction on the guide rails 31, 31. The chuck table mechanism 3 further includes a second sliding block 33 disposed for movement in a Y-axis direction on the first sliding block 32, a support table 35 supported on the second sliding block 33 by a cylindrical member 34, and a chuck table 36 as workpiece holding means. The chuck table 36 includes a suction chuck 361 formed from a porous material and holds a semiconductor wafer, for example, of a circular shape, which is a workpiece, on a holding face which is an upper face of the suction chuck 361 by suction means not shown. The chuck table 36 configured in this manner is rotated by a pulse motor not shown disposed in the cylindrical member 34. It is to be noted that clamps 362 for fixing an annular frame which supports a workpiece such as a semiconductor wafer with a protective tape interposed therebetween are disposed on the chuck table 36.

The first sliding block 32 has a pair of guided grooves 321, 321 provided on a lower face thereof for fitting with the paired guide rails 31, 31, and has a pair of guide rails 322, 322 provided on an upper face thereof and formed in parallel to each other along the Y-axis direction. The first sliding block 32 configured in this manner is configured for movement in the X-axis direction along the paired guide rails 31, 31 through fitting engagement of the guided grooves 321, 321 with the paired guide rails 31, 31. The chuck table mechanism 3 includes machining feeding means 37 for moving the first sliding block 32 in the X-axis direction along the paired guide rails 31, 31. The machining feeding means 37 includes a male thread rod 371 disposed in parallel to and between the paired guide rails 31 and 31, a pulse motor 372 for driving the male thread rod 371 to rotate, and so forth. The male thread rod 371 is supported at one end thereof for rotation on a bearing block 373 fixed to the stationary base 2 and connected at an other end thereof for power transmission to an output power shaft of the pulse motor 372. It is to be noted that the male thread rod 371 is screwed in a penetrating female thread hole formed in a female thread block not shown provided in a projecting manner on a lower face of a central portion of the first sliding block 32. Accordingly, by driving the male thread rod 371 to rotate forwardly and backwardly by the pulse motor 372, the first sliding block 32 is moved in the X-axis direction along the guide rails 31, 31.

The second sliding block 33 has a pair of guided grooves 331, 331 provided on a lower face thereof for fitting with the paired guide rails 322, 322 provided on the upper face of the first sliding block 32 and is configured for movement in the Y-axis direction with the guided grooves 331, 331 thereof fitted with the paired guide rails 322, 322. The chuck table mechanism 3 includes indexing feeding means 38 for moving the second sliding block 33 in the Y-axis direction along the paired guide rails 322, 322 provided on the first sliding block 32. The indexing feeding means 38 includes a male thread rod 381 disposed in parallel to and between the paired guide rails 322 and 322, and a driving source such as a pulse motor 382 for driving the male thread rod 381 to rotate. The male thread rod 381 is supported at one end thereof for rotation on a bearing block 383 fixed to the upper face of the first sliding block 32 and connected at an other end thereof for power transmission to an output power shaft of the pulse motor 382. It is to be noted that the male thread rod 381 is screwed in a penetrating female thread hole formed in a female thread block not shown provided in a projecting manner on a lower face of a central portion of the second sliding block 33. Accordingly, by driving the male thread rod 381 to rotate forwardly and backwardly by the pulse motor 382, the second sliding block 33 is moved in the Y-axis direction along the guide rails 322, 322.

Figure 2:
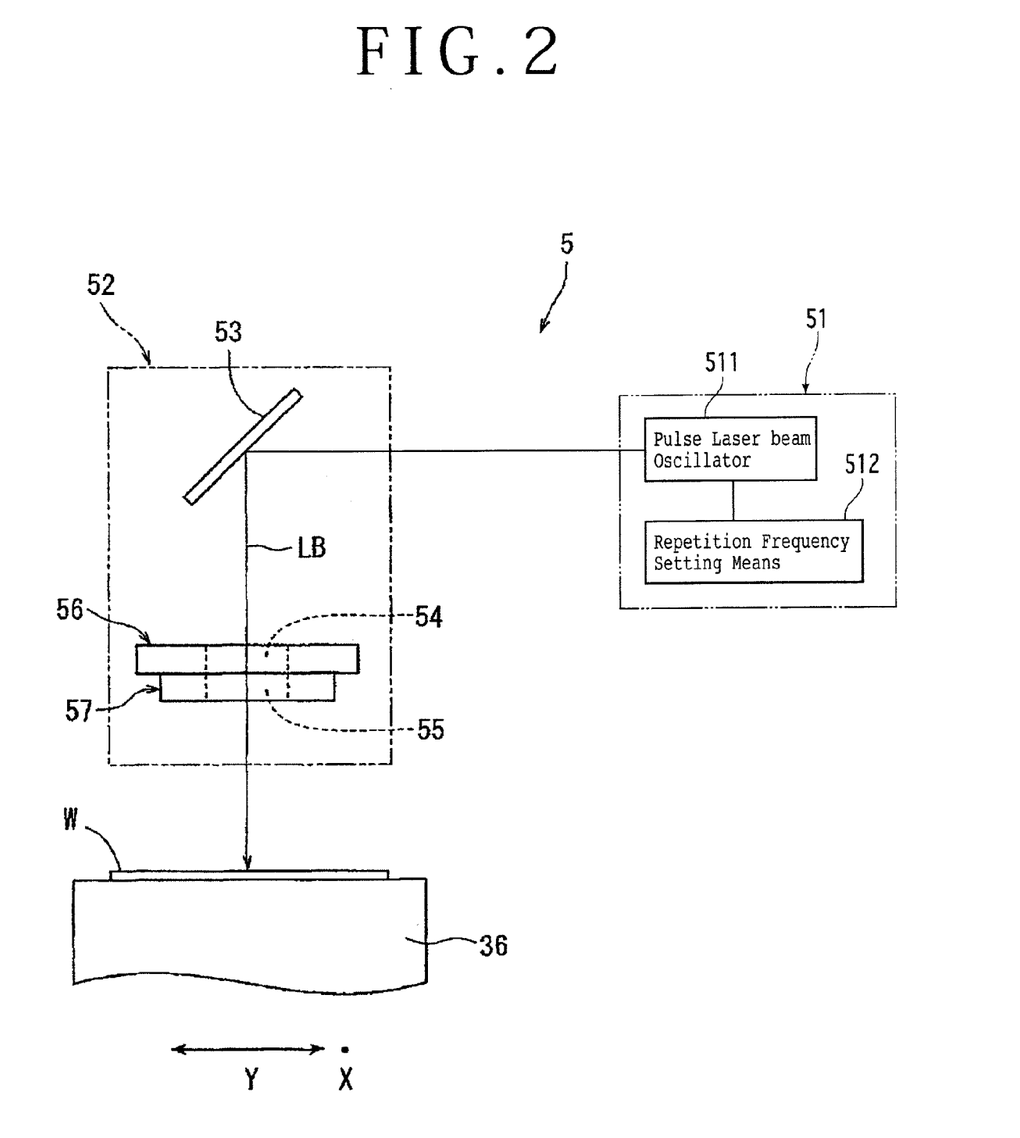
FIG. 2 is a block diagram of laser beam irradiation means incorporated in the laser machining apparatus shown in FIG. 1.

The laser beam irradiation unit 4 includes a support member 41 disposed on the stationary base 2, and a casing 42 supported on the support member 41 and extending substantially horizontally. The laser beam irradiation unit 4 further includes laser beam irradiation means 5 disposed on the casing 42, and image pickup means 6 for detecting a machining region to be laser machined. As shown in FIG. 2, the laser beam irradiation means 5 includes pulse laser beam oscillation means 51, and a condenser 52 for condensing a pulse laser beam oscillated from the pulse laser beam oscillation means 51 and irradiating the condensed pulse laser beam upon a workpiece W held on the chuck table 36. The pulse laser beam oscillation means 51 is configured from a pulse laser beam oscillator 511 configured from a YAG laser oscillator or a YVO4 laser oscillator, and repetition frequency setting means 512 provided for the pulse laser beam oscillator 511.

The condenser 52 includes a direction changing mirror 53 for changing the direction of a pulse laser beam oscillated from the pulse laser beam oscillation means 51 to a downward direction in FIG. 2. The condenser 52 further includes a first condenser lens 54 and a second condenser lens 55 disposed in series in the direction of an optical path of a pulse laser beam LB changed in direction by the direction changing mirror 53. The condenser 52 further includes first moving means 56 for moving the first condenser lens 54 in a first direction (Y-axis direction) perpendicular to the optical path of the pulse laser beam LB, and second moving means 57 for moving the second condenser lens 55 in a second direction (X-axis direction) perpendicular to the first direction (Y-axis direction).

Figure 3A:
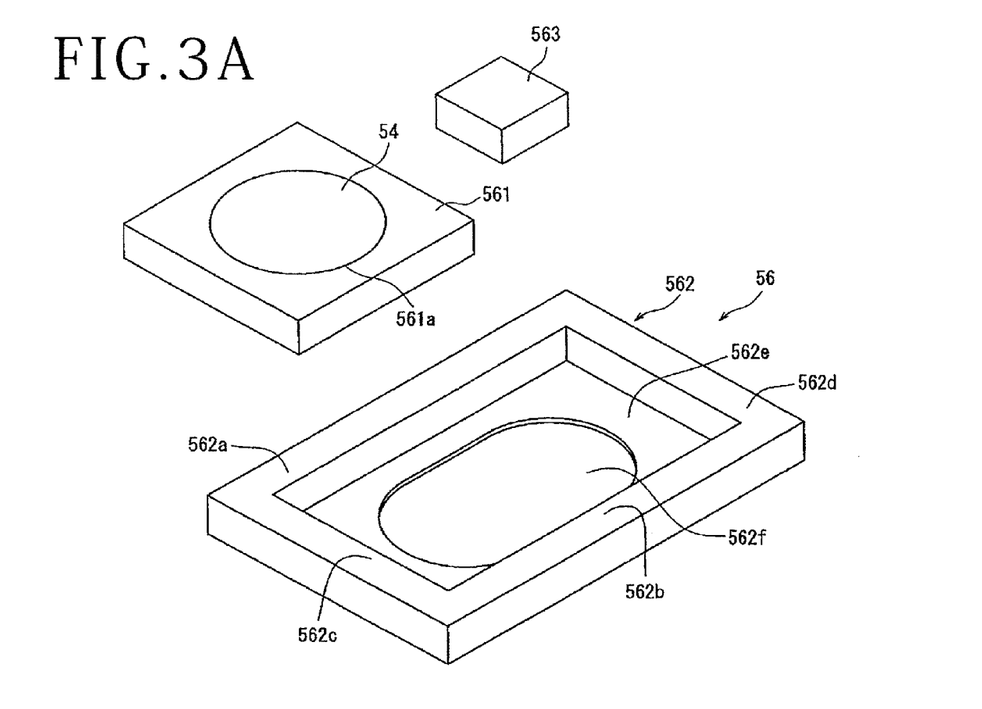
FIG. 3A is an exploded perspective view of a first condenser lens and first moving means which configure a condenser of the laser beam irradiation means shown in FIG. 2.
Figure 3B:
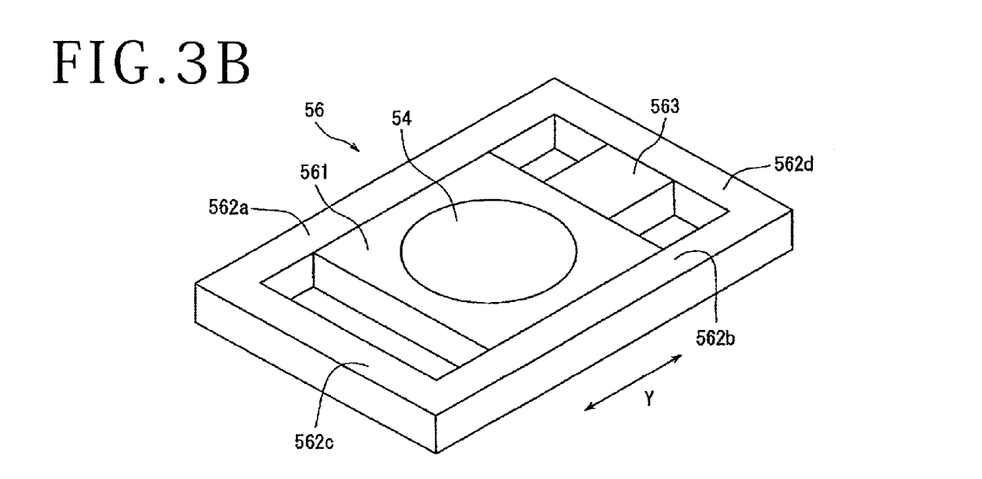
FIG. 3B is a perspective view of the first condenser lens and the first moving means.

The first moving means 56 for moving the first condenser lens 54 in the first direction (Y-axis direction) perpendicular to the optical path of the pulse laser beam LB and the second moving means 57 for moving the second condenser lens 55 in the second direction (X-axis direction) perpendicular to the first direction (Y-axis direction) are described with reference to FIGS. 3A to 5. As shown in FIGS. 3A and 3B, the first moving means 56 is configured from a first lens frame body 561 on which the first condenser lens 54 is mounted, a first supporting frame body 562 for supporting the first lens frame body 561 for movement in the Y-axis direction, and a first driving source 563 for moving the first lens frame body 561 in the Y-axis direction. The first lens frame body 561 is formed in a square shape and has a lens fitting hole 561a provided at a central portion thereof, and the first condenser lens 54 is fitted in and supported by the lens fitting hole 561a. The first driving source 563 is mounted on one side face of the first lens frame body 561 formed in this manner. The first driving source 563 is configured, in the embodiment shown, from a piezoelectric element whose expansion width varies in response to power supplied thereto. It is to be noted that the first driving source 563 can be configured using a voice coil motor or electromagnetic driving means.

As shown in FIG. 3A, the first supporting frame body 562 is configured from two side plates 562a and 562b having an equal length and extending in parallel to each other and two end plates 562c and 562d having an equal length and extending in parallel to each other, which form a rectangular frame, and a bottom plate 562e mounted on lower faces of the side plates 562a and 562b and the end plates 562c and 562d. An elliptical opening 562f whose minor axis is equal to the diameter of the first condenser lens 54 is formed in the bottom plate 562e. It is to be noted that the length between inner faces of the two side plates 562a and 562b is formed with a dimension corresponding to the length of one side of the first lens frame body 561. In the first supporting frame body 562 configured in this manner, the first lens frame body 561 on which the first driving source 563 is mounted is disposed as shown in FIG. 3B. Then, the first driving source 563 mounted on the first lens frame body 561 is mounted on an inner face of the end plate 562d which configures the first supporting frame body 562.

Now, the second moving means 57 is described with reference to FIGS. 4A and 4B. The second moving means 57 is configured from a second lens frame body 571 on which the second condenser lens 55 is mounted, a second supporting frame body 572 for supporting the second lens frame body 571 for movement in the X-axis direction thereon, and a second driving source 573 for moving the second lens frame body 571 in the X-axis direction. The second lens frame body 571 is formed in a square shape and has a lens fitting hole 571a formed at a central portion thereof such that the second condenser lens 55 is fitted in and supported by the lens fitting hole 571a. The second driving source 573 is mounted on one side face of the second lens frame body 571 formed in this manner. The second driving source 573 is configured, in the present embodiment, from a piezoelectric element whose expansion width varies in response to power supplied thereto. It is to be noted that the second driving source 573 can be formed using a voice coil motor or electromagnetic driving means.

Figure 4A:
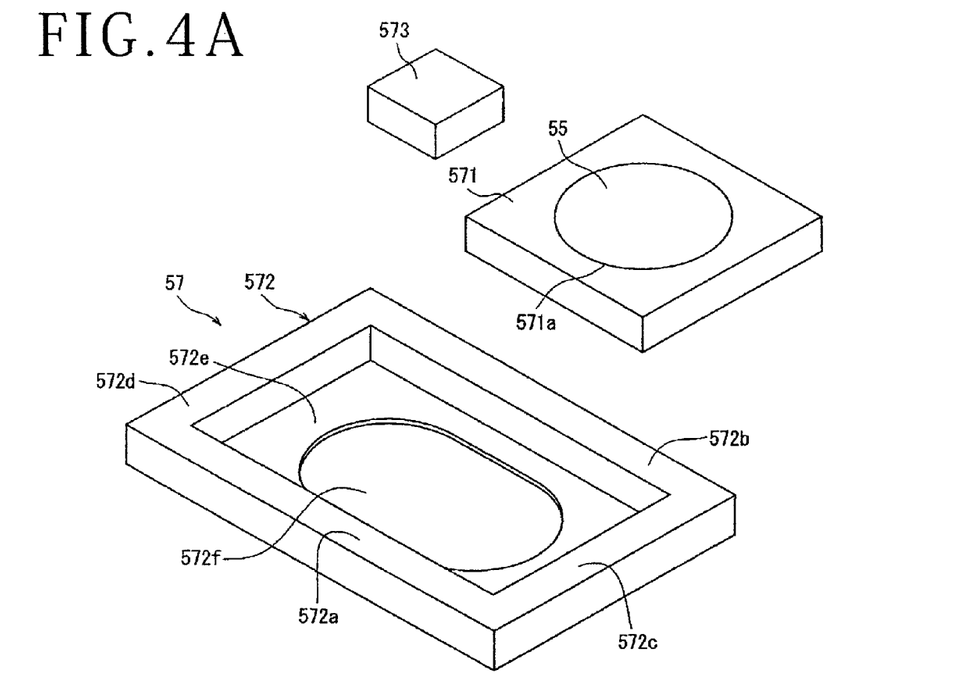
FIG. 4A is an exploded perspective view of a second condenser lens and second moving means which configure the condenser of the laser beam irradiation means shown in FIG. 2.
Figure 4B:
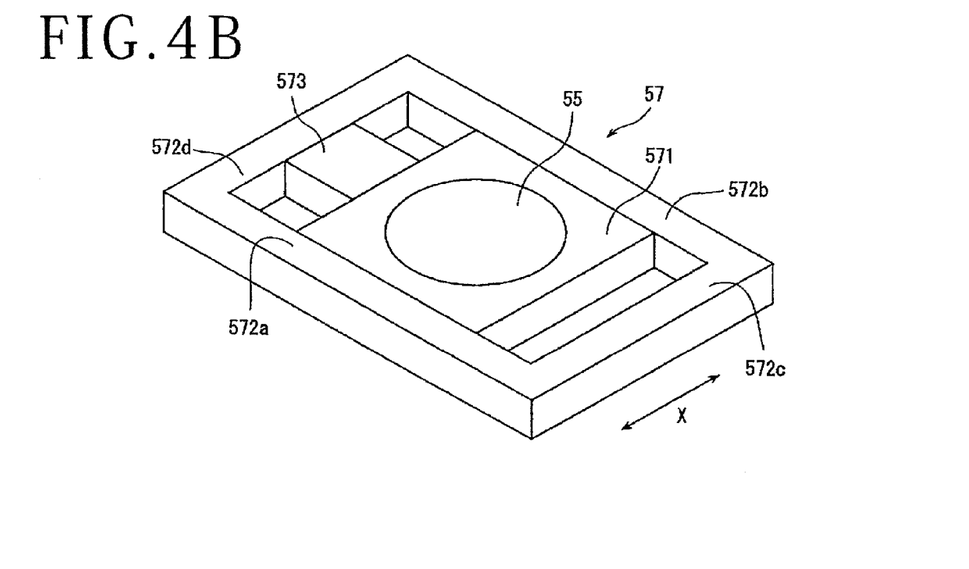
FIG. 4B is a perspective view of the second condenser lens and the second moving means.

As shown in FIG. 4A, the second supporting frame body 572 is configured from two side plates 572a and 572b having an equal length and extending in parallel to each other and two end plates 572c and 572d having an equal length and extending in parallel to each other, which form rectangular frame, and a bottom plate 572e mounted on lower faces of the two side plates 572a and 572b and the two end plates 572c and 572d. An elliptical opening 572f whose minor diameter is equal to the diameter of the second condenser lens 55 is provided in the bottom plate 572e. It is to be noted that the length between inner faces of the two side plates 572a and 572b is formed with a dimension corresponding to the length of one side of the second lens frame body 571. The second lens frame body 571 on which the second driving source 573 is mounted in such a manner as illustrated in FIG. 4B is disposed in the second supporting frame body 572 configured in this manner. Further, the second driving source 573 mounted on the second lens frame body 571 is mounted on an inner face of the end plate 572d which configures the second supporting frame body 572. The first moving means 56 and the second moving means 57 configured in such a manner as described above are disposed above and below as shown in FIG. 5.

Figure 5:
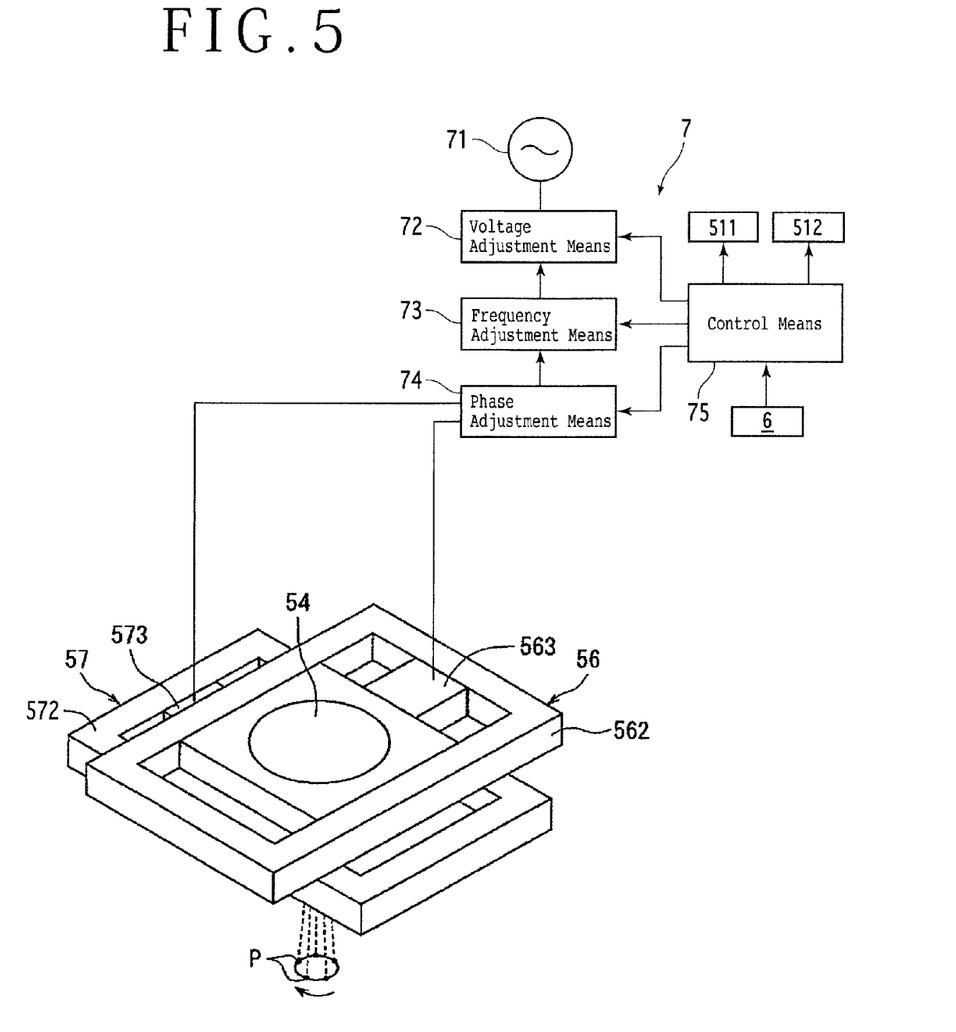
FIG. 5 is a perspective view showing the first condenser lens and the first moving means shown in FIG. 3B and the second condenser lens and the second moving means shown in FIG. 4B in an assembled state and a block diagram of power supplying means for supplying power to the first moving means and the second moving means.

Referring to FIG. 5, the laser beam irradiation means 5 includes power supplying means 7 for supplying power to the first driving source 563 and the second driving source 573. The power supplying means 7 in the embodiment shown in FIG. 5 includes an AC power supply 71, voltage adjustment means 72 serving as power adjustment means, frequency adjustment means 73 for adjusting the frequency of the AC power, and phase adjustment means 74 for adjusting the phase of the AC power to be supplied to the first driving source 563 and the power supplying means 7. The power supplying means 7 further includes control means 75 for controlling the voltage adjustment means 72, the frequency adjustment means 73 and the phase adjustment means 74. It is to be noted that the control means 75 is configured, in the embodiment shown, to control also the pulse laser beam oscillator 511 and the repetition frequency setting means 512 of the pulse laser beam oscillation means 51.

Figure 6A:
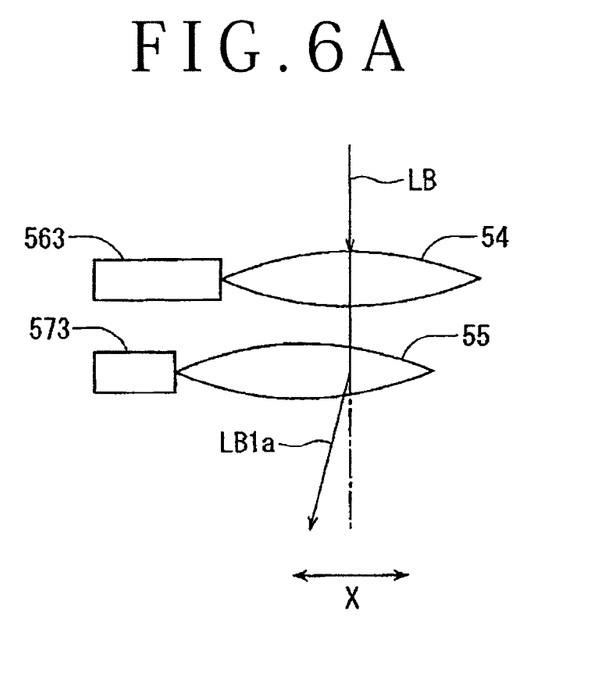
FIGS. 6A and 6B are schematic views each illustrating a state in which a laser beam incident to the condenser is deflected in an X-axis direction by displacing the second condenser lens, which configures the condenser of the laser beam irradiation means shown in FIG. 2, in the X-axis direction.
Figure 6B:
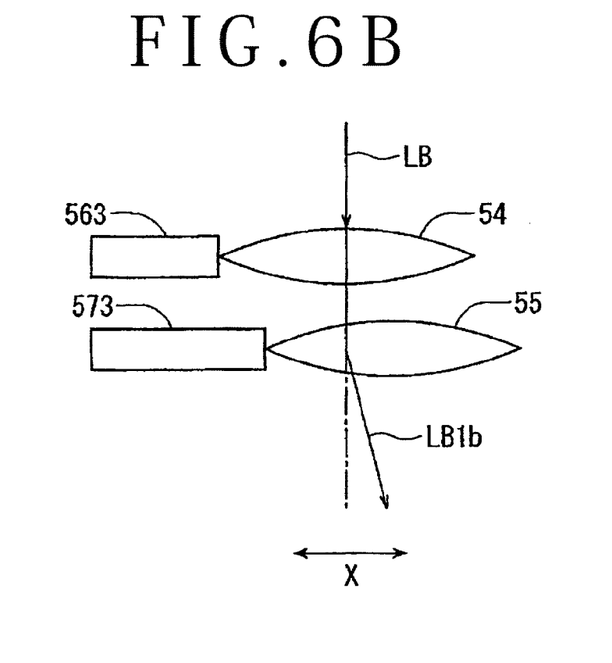

Here, a laser beam which passes the first condenser lens 54 and the second condenser lens 55 is described with reference to FIGS. 6A and 6B. FIG. 6A illustrates a state in which the center of the first condenser lens 54 is positioned on the optical path of the pulse laser beam LB after the change in direction by the direction changing mirror 53 and the second condenser lens 55 is positioned leftwardly in FIG. 6A with respect to the optical path of the pulse laser beam LB. In the state illustrated in an exaggerated manner in FIG. 6A, the pulse laser beam LB passes, after passing the center of the first condenser lens 54, the right in FIG. 6A with respect to the center of the second condenser lens 55 so that the pulse laser beam LB is displaced leftwardly in FIG. 6A in the X-axis direction with respect to the optical path of the pulse laser beam LB as indicated by LB1a. The amount of this displacement is 10 to 100 μm. Meanwhile, FIG. 6B illustrates a state in which the center of the first condenser lens 54 is positioned on the optical path of the pulse laser beam LB after the change in direction by the direction changing mirror 53 and the second condenser lens 55 is positioned rightwardly in FIG. 6B with respect to the optical path of the pulse laser beam LB. In the state illustrated in an exaggerated manner in FIG. 6B, the pulse laser beam LB passes, after passing the center of the first condenser lens 54, the left in FIG. 6B with respect to the center of the second condenser lens 55 so that the pulse laser beam LB is displaced rightwardly in FIG. 6B in the X-axis direction with respect to the optical path of the pulse laser beam LB as indicated by LB1b. Accordingly, by supplying the AC power to the second driving source 573 for moving the second condenser lens 55 in the X-axis direction, the pulse laser beam LB whose direction is changed by the direction changing mirror 53 can be displaced alternately to LB1a and LB1b.

Figure 7A:
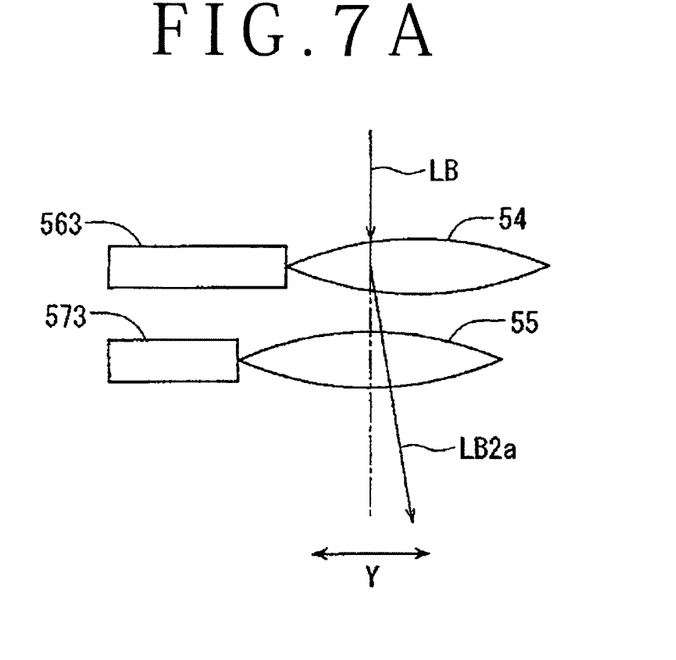
FIGS. 7A and 7B are schematic views each illustrating a state in which a laser beam incident to the condenser is deflected in a Y-axis direction by displacing the first condenser lens, which configures the condenser of the laser beam irradiation means shown in FIG. 2, in the Y-axis direction.
Figure 7B:
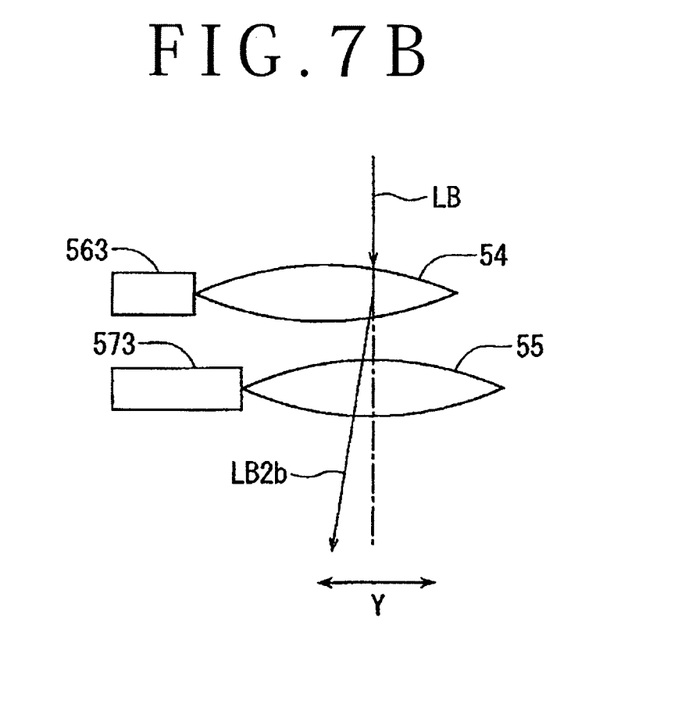

Meanwhile, FIG. 7A illustrates a state in which the center of the second condenser lens 55 is positioned on the optical path of the pulse laser beam LB after the change in direction by the direction changing mirror 53 and the first condenser lens 54 is positioned rightwardly in FIG. 7A with respect to the optical path of the pulse laser beam LB. In the state illustrated in an exaggerated manner in FIG. 7A, the pulse laser beam LB passes the left in FIG. 7A with respect to the center of the first condenser lens 54 so that the pulse laser beam LB is displaced rightwardly in FIG. 7A in the Y-axis direction with respect to the optical path of the pulse laser beam LB as indicated by LB2a. This displacement amount is 10 to 100 μm. Meanwhile, FIG. 7B illustrates a state in which the center of the second condenser lens 55 is positioned on the optical path of the pulse laser beam LB after the change in direction by the direction changing mirror 53 and the first condenser lens 54 is positioned leftwardly in FIG. 7B with respect to the optical path of the pulse laser beam LB. In the state illustrated in an exaggerated manner in FIG. 7B, the pulse laser beam LB passes the right in FIG. 7B with respect to the center of the first condenser lens 54 so that the pulse laser beam LB is displaced leftwardly in FIG. 7B in the Y-axis direction with respect to the optical path of the pulse laser beam LB as indicated by LB2b. Accordingly, by supplying the AC power to the first driving source 563 for moving the first condenser lens 54 in the Y-axis direction, the pulse laser beam LB after the change in direction by the direction changing mirror 53 can be displaced alternately to LB2a and LB2b.

It is to be noted that, by forming a phase difference of 90 degrees between the AC power to be applied to the first driving source 563 for moving the first condenser lens 54 in the Y-axis direction and the AC power to be supplied to the second driving source 573 for moving the second condenser lens 55 in the X-axis direction, a focusing spot P of the pulse laser beam LB to be displaced by the first condenser lens 54 and the second condenser lens 55 is moved so as to draw a circular trajectory as shown in FIG. 5. By controlling the AC power to be supplied to the first driving source 563 and the second driving source 573 each formed from a piezoelectric element, a voice coil motor or electromagnetic driving means in this manner, the first condenser lens 54 can be moved in the Y-axis direction and at the same time the second condenser lens 55 can be moved in the X-axis direction. Therefore, the focusing spot P of a laser beam LB of stabilized power can be displaced instantaneously.

Referring back to FIG. 1, the image pickup means 6 is configured from, in addition to an ordinary image pickup device (CCD) for picking up an image using a visible beam, infrared illumination means for irradiating infrared rays upon a workpiece, an optical system for capturing the infrared rays irradiated by the infrared illumination means, an image pickup device (infrared CCD) for outputting an electric signal corresponding to the infrared rays captured by the optical system, and so forth. In the embodiment shown in FIG. 1, the image pickup means 6 sends an image signal of a picked up image to the control means 75.

Figure 8:
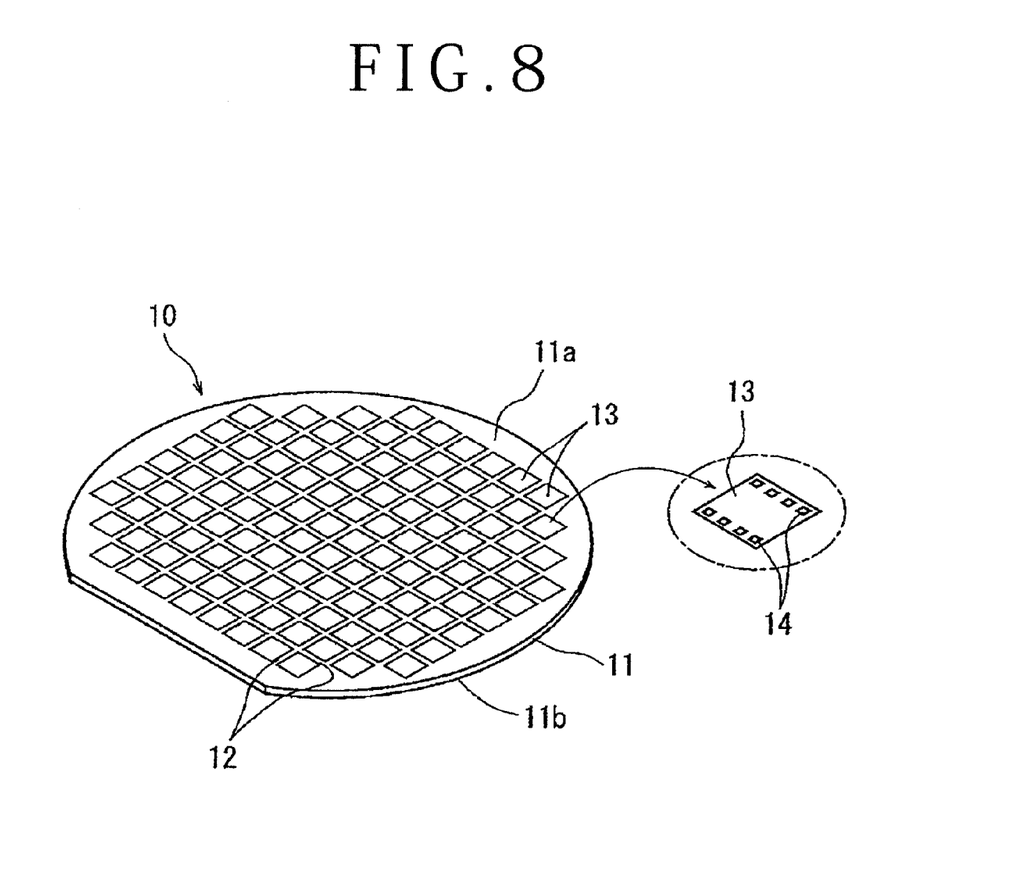
FIG. 8 is a perspective view of a semiconductor wafer as a workpiece.

The laser machining apparatus according to the embodiment shown in the drawings is configured in such a manner as described above, and operation of the laser machining apparatus is described below. FIG. 8 shows a perspective view of a semiconductor wafer 10 as a wafer. The semiconductor wafer 10 shown in FIG. 8 has a plurality of regions partitioned by a plurality of streets 12 arrayed in a lattice shape on a front face 11a of a substrate 11 formed from silicon of a thickness of, for example, 100 μm. A device 13 such as an IC or an LSI is formed in each of the partitioned regions. All of the devices 13 have a same configuration. A plurality of bonding pads 14 are formed on a surface of each device 13. The bonding pads 14 are made of a metal material such as aluminum, copper, gold, platinum or nickel and formed so as to have a thickness of 1 to 5 μm.

In order to form a via hole extending to a bonding pad 14 on the substrate 11 of the semiconductor wafer 10 shown in FIG. 8 using the laser machining apparatus described above, the front face 11a of the substrate 11 which configures the semiconductor wafer 10 is placed on the chuck table 36 of the laser machining apparatus, and the semiconductor wafer 10 is sucked to and held on the chuck table 36. Accordingly, the semiconductor wafer 10 is held with a rear face 11b of the substrate 11 directed upwardly.

The chuck table 36 to and on which the semiconductor wafer 10 is sucked and held in such a manner as described above is positioned immediately below the image pickup means 6 by the machining feeding means 37. Then, alignment work for adjusting the semiconductor wafer 10 held on the chuck table 36 so that the streets 12 of a lattice shape formed on the semiconductor wafer 10 extend in parallel to the X-axis direction and the Y-axis direction is carried out. In particular, an image of the semiconductor wafer 10 held on the chuck table 36 is picked up by the image pickup means 6 and an image process such as pattern matching is executed for the picked up image to carry out the alignment work. At this time, although the front face 11a of the substrate 11 of the semiconductor wafer 10 on which the streets 12 are formed is positioned on the lower side, since the image pickup means 6 includes the image pickup means configured from infrared illumination means, an optical system for capturing infrared rays, an image pickup device (infrared CCD) for outputting en electric signal corresponding to the infrared rays and so forth as described above, an image of the streets 12 can be picked up through the substrate 11 from the rear face 11b of the substrate 11.

By carrying out the alignment work described above, the semiconductor wafer 10 held on the chuck table 36 is positioned at a predetermined coordinate position. It is to be noted that coordinate positions for design of the plural bonding pads 14 formed on the devices 13 formed on the front face 11a of the substrate 11 of the semiconductor wafer 10 are stored in the control means 75 in advance.

Figure 9:
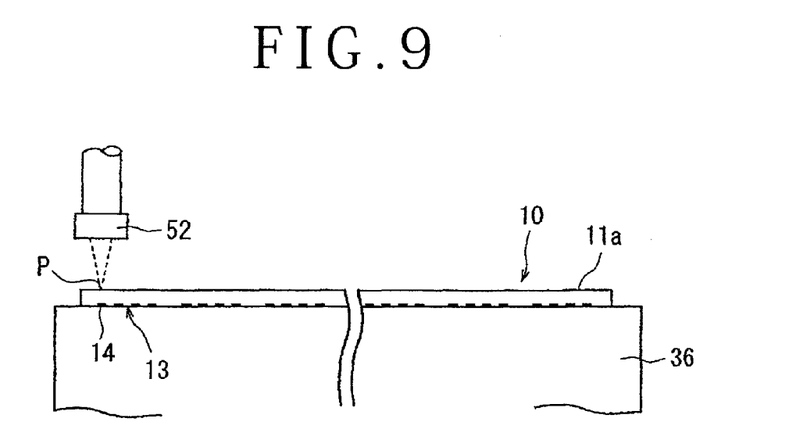
FIG. 9 is a schematic view of a via hole formation step carried out using the laser machining apparatus shown in FIG. 1.

After the alignment work described above is carried out, the chuck table 36 is moved as shown in FIG. 9 until the device 13 at the leftmost end in FIG. 9 from among the devices 13 formed in a predetermined direction on the substrate 11 of the semiconductor wafer 10 is positioned just below the condenser 52. Then, the bonding pad 14 at the leftmost end from among the bonding pads 14 formed on the device 13 at the leftmost end in FIG. 9 is positioned just below the condenser 52.

After the predetermined bonding pad 14 is positioned just below the condenser 52 as shown in FIG. 9, a via hole formation step of irradiating a laser beam from the rear face 11b side of the substrate 11 to form a via hole extending to the bonding pad 14 is carried out. At this time, the control means 75 supplies AC powers with a phase difference of 90 degrees from each other to the first driving source 563 which configures the condenser 52 and moves the first condenser lens 54 in the Y-axis direction and the second driving source 573 which configures the condenser 52 and moves the second condenser lens 55 in the X-axis direction. Accordingly, the focusing spot P of the laser beam LB displaced by the first condenser lens 54 and the second condenser lens 55 is moved so as to draw a circular trajectory as shown in FIG. 5.

It is to be noted that machining conditions for the via hole formation step described above are set, for example, in the following manner.

Figure 10:
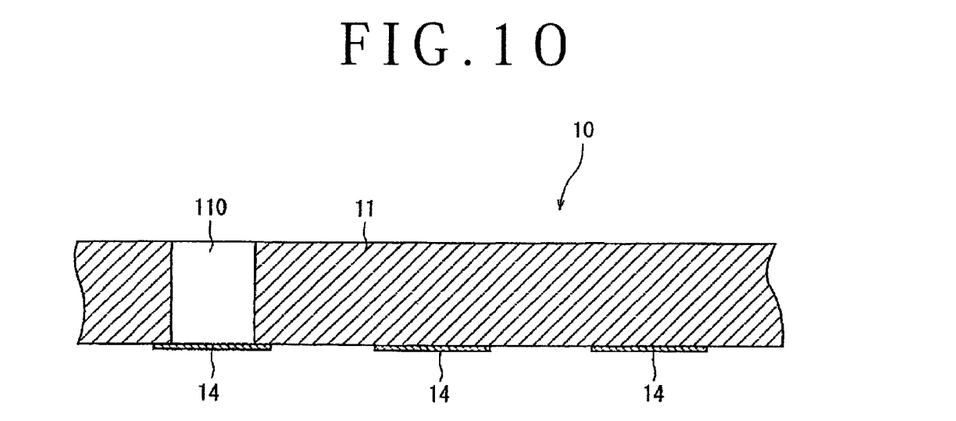
FIG. 10 is a partial enlarged sectional view of the semiconductor wafer in which a via hole is formed by carrying out the via hole formation step illustrated in FIG. 9.

Light source for laser beam: YVO4 laser or YAG laser
Wavelength: 355 nm
Repetition frequency: 10 kHz
Energy density per one pulse: 30 to 40 J/cm$^2$
Spot diameter: $\phi$35 μm In the machining conditions described above, if it is assumed that the amount of movement of the first condenser lens 54 which is moved in the Y-axis direction by the first driving source 563 and the amount of movement of the second condenser lens 55 which is moved in the X-axis direction by the second driving source 573 are each 35 μm, then a via hole 110 having a diameter of 70 μm as shown in FIG. 10 is formed on the substrate 11 of the semiconductor wafer 10. Then, by irradiating the pulse laser beam LB by a predetermined number of times, the via hole 110 extending from the rear face 11b to the front face 11a, namely, to the bonding pad 14, can be formed in the substrate 11 as shown in FIG. 10.

After the via hole 110 extending to the predetermined bonding pad 14 of the substrate 11 of the semiconductor wafer 10 is formed at the position corresponding to the bonding pad 14, the positions corresponding to the bonding pads 14 are successively positioned just below the condenser 52 to carry out the via hole formation step.

Figure 11:
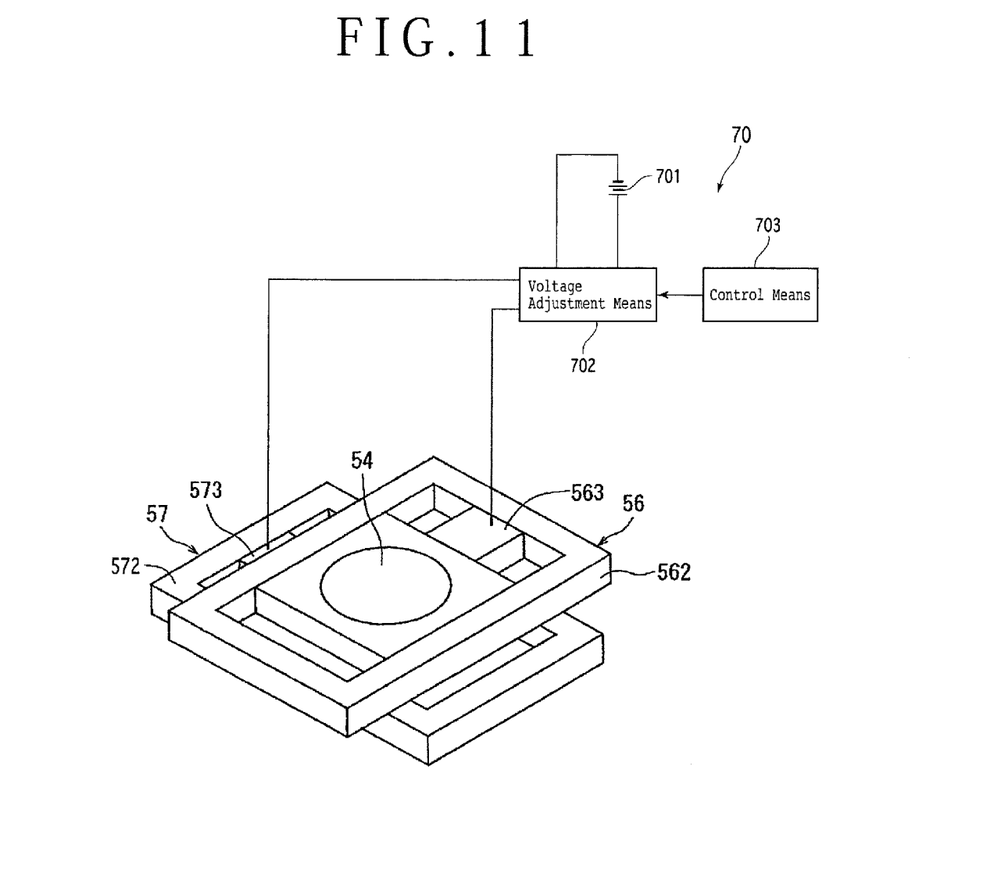
FIG. 11 is a block diagram showing another embodiment of the power supplying means which configures the laser beam irradiation means incorporated in the laser machining apparatus shown in FIG. 1.

Now, another embodiment of the present invention is described with reference to FIG. 11. While the power supplying means 7 described hereinabove with reference to FIG. 5 is an example in which AC power is supplied to the first driving source 563 and the second driving source 573, a power supplying means 70 shown in FIG. 11 is configured such that it supplies DC power to the first driving source 563 and the second driving source 573. In particular, the power supplying means 70 in the embodiment shown in FIG. 11 includes a DC power supply 701, voltage adjustment means 702 serving as power adjustment means, and control means 703 for controlling the voltage adjustment means 702. The power supplying means 70 configured in this manner moves the first condenser lens 54 and the second condenser lens 55 in the Y-axis direction and the X-axis direction in response to the voltages of the DC power supplied to the first driving source 563 and the second driving source 573. Accordingly, the focusing spot P of the laser beam LB displaced by the first condenser lens 54 and the second condenser lens 55 is displaced in the Y-axis direction and the X-axis direction and maintained. By using the power supplying means 70 shown in FIG. 11 in this manner, the first condenser lens 54 and the second condenser lens 55 can be moved by predetermined amounts in the Y-axis direction and the X-axis direction in response to the voltages of the DC power supplied to the first driving source 563 and the second driving source 573 thereby to displace the focusing spot P of the laser beam LB by predetermined amounts in the Y-axis direction and the X-axis direction and maintain the focusing spot P. Therefore, the pulse laser beam LB can be irradiated at the same machining position following the movement of the workpiece.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A laser machining apparatus, comprising:
   workpiece holding means for holding a workpiece; and
   laser beam irradiation means including laser beam oscillation means for oscillating a laser beam, and a condenser for condensing the laser beam oscillated by the laser beam oscillation means and irradiating the condensed laser beam upon the workpiece held on the workpiece holding means;
   wherein the condenser includes
      first and second condenser lenses arrayed in series in an advancing direction of the laser beam,
      first moving means having a first driving source for moving the first condenser lens in a first direction perpendicular to an optical axis of the first condenser lens, and
      second moving means having a second driving source for moving the second condenser lens in a second direction perpendicular to the first direction, and
   the laser machining apparatus further comprises:
      power supplying means for supplying power to the first driving source of the first moving means and the second driving source of the second moving means.

2. The laser machining apparatus according to claim 1, wherein the first driving source and the second driving source are each configured from a piezoelectric device.

3. The laser machining apparatus according to claim 1, wherein the power supplying means includes
   output adjustment means for adjusting outputs of AC (alternate current) power to be supplied to the first driving source and the second driving source,
   frequency adjustment means for adjusting a frequency of the AC power the outputs of which have been adjusted by the output adjustment means,
   phase adjustment means for adjusting a phase of the AC power to be supplied to the first driving source and the second driving source, and control means for controlling the output adjustment means, frequency adjustment means and phase adjustment means.

4. The laser machining apparatus according to claim 3, wherein the control means controls the phase adjustment means so as to form a phase difference of 90 degrees between the AC power to be supplied to the first driving source and the AC power to be supplied to the second driving source.

\* \* \* \* \*